(12) United States Patent
Mori

(10) Patent No.: US 11,277,872 B2
(45) Date of Patent: Mar. 15, 2022

(54) RADIO COMMUNICATION EQUIPMENT AND CONTROL METHOD THEREOF

(71) Applicant: KYOCERA Corporation, Kyoto (JP)

(72) Inventor: Daisuke Mori, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 56 days.

(21) Appl. No.: 16/548,508

(22) Filed: Aug. 22, 2019

(65) Prior Publication Data

US 2019/0380157 A1 Dec. 12, 2019

Related U.S. Application Data

(63) Continuation of application No. PCT/JP2018/006527, filed on Feb. 22, 2018.

(30) Foreign Application Priority Data

Feb. 24, 2017 (JP) .............................. JP2017-032958

(51) Int. Cl.
*H04W 76/10* (2018.01)
*H04W 4/40* (2018.01)
(Continued)

(52) U.S. Cl.
CPC ............. *H04W 76/10* (2018.02); *H04W 4/40* (2018.02); *H04W 8/18* (2013.01); *H04W 68/005* (2013.01)

(58) Field of Classification Search
CPC ......... H04W 76/10; H04W 4/40; H04W 8/18; H04W 68/005
See application file for complete search history.

(56) References Cited

U.S. PATENT DOCUMENTS

2004/0192251 A1* 9/2004 Zhao ....................... H04W 4/90
455/404.1
2005/0227719 A1* 10/2005 Gunaratnam ......... H04W 48/18
455/510
(Continued)

FOREIGN PATENT DOCUMENTS

CN 102821380 A * 12/2012
CN 105072245 B 9/2018
(Continued)

OTHER PUBLICATIONS howardforums.com, "I've got more phones than fingers", 1 page, posted May 26, 2012 by user "B407", retrieved from Internet <https://www.howardforums.com/showthread.php/1765630-Please-Help!-Chatr-SIM-On-An-iPhone-4S-quot-No-Service-quot> (Year: 2012).*

(Continued)

*Primary Examiner* — Michael K Phillips
(74) *Attorney, Agent, or Firm* — Studebaker & Brackett PC

(57) ABSTRACT

A radio communication equipment installed on a vehicle, comprises a radio communicator configured to perform radio communication with a base station capable of communicating with a network, an information card configured to store network information of a network operator providing a service, and a controller configured to establish connection with the network via the radio communicator and treat the information card as invalid when the connection with the network fails, in which the controller is configured to notify of an electric field strength of a radio signal transmitted from the base station when treating the information card as invalid.

5 Claims, 4 Drawing Sheets

(51) Int. Cl.
*H04W 8/18* (2009.01)
*H04W 68/00* (2009.01)

(56) References Cited

U.S. PATENT DOCUMENTS

| | | | | |
|---|---|---|---|---|
| 2009/0170507 | A1* | 7/2009 | Kim | H04W 60/02 455/433 |
| 2010/0317403 | A1 | 12/2010 | Mizuo | |
| 2015/0257071 | A1* | 9/2015 | Tsuda | H04W 4/60 455/436 |
| 2015/0349824 | A1* | 12/2015 | Cho | H04B 1/3816 455/558 |
| 2015/0358957 | A1* | 12/2015 | Kim | H04L 5/0058 455/450 |
| 2017/0055164 | A1* | 2/2017 | Santhanam | H04W 48/00 |
| 2017/0353939 | A1* | 12/2017 | Behera | H04W 8/18 |
| 2019/0045423 | A1* | 2/2019 | Kumar | H04W 8/183 |

FOREIGN PATENT DOCUMENTS

| | | |
|---|---|---|
| JP | 2008244513 A | 10/2008 |
| JP | 2009055326 A | 3/2009 |
| JP | 2016111409 A | 6/2016 |
| KR | 20140146819 A * | 12/2014 |

OTHER PUBLICATIONS

Screen shot of a GSM-Dual-SIM-Smartphone with SIM cards for the D1 and D2 mobile network, which, if access to the contract network (here D1) has failed, but the third-party network can be received (D2, here without transmission, but with reception authorization) nevertheless shows the external network signal strength, 2 pages.

Universal Mobile Telecommunications System (UMTS); LTE; Non-Access-Stratum (NAS) protocol for Evolved Packet System (EPS); Stage 3, 3GPP TS 24.301 version 10.3.0 Release 10), ETSI, Jun. 2011, 27 pages.

Non-official translation by Unagami et al., "Carplay" that incorporates iOS in the in-vehicle system will be fully deployed in 2014 Carplay and car life and apple, Mac Fan, Jun. 1, 2014, vol. 22, No. 6, pp. 18-25.

Tablet Otokuwaza Best Selection, Oct. 1, 2016, p. 82, Shinyusha Co., Ltd., Tokyo, Japan.

* cited by examiner

FIG. 4

| CAUSE VALUE | CAUSE |
|---|---|
| #2 | IMSI UNKNOWN IN HSS |
| #3 | ILLEGAL UE |
| #6 | ILLEGAL ME |
| #7 | EPS SERVICES NOT ALLOWED |
| #8 | EPS SERVICES AND NON-EPS SERVICES NOT ALLOWED |

RADIO COMMUNICATION EQUIPMENT AND CONTROL METHOD THEREOF

RELATED APPLICATIONS

The present application is a continuation based on PCT Application No. PCT/JP2018/006527, filed on Feb. 22, 2018, which claims the benefit of Japanese Patent Application No. 2017-032958 (filed on Feb. 24, 2017). The content of which is incorporated by reference herein in their entirety.

TECHNICAL FIELD

The present invention relates to a radio communication equipment including an information card such as a SIM card and a control method thereof.

BACKGROUND ART

Some radio communication modules compliant with the 3rd generation partnership project (3GPP) are equipped with a subscriber identity module (SIM) card or a user identity module (UIM) card (hereinafter collectively referred to simply as "SIM card") provided by a network operator (also referred to as an operator or a communication common carrier). The SIM card is an IC card in which subscriber (user) information of the radio communication module and a contracted service are stored. The user can use the communication equipment in which the SIM card is attached, and the contracted service is available (see, for example, Patent Literature 1).

SUMMARY

A radio communication equipment for this application which is installed on a vehicle, comprises a radio communicator configured to perform radio communication with a base station capable of communicating with a network, an information card configured to store network information of a network operator providing a service, and a controller configured to establish connection with the network via the radio communicator and treat the information card as invalid when the connection with the network fails, in which the controller is configured to notify of an electric field strength of a radio signal transmitted from the base station when treating the information card as invalid.

BRIEF DESCRIPTION OF DRAWINGS

FIG. 4 is a diagram illustrating the description of a cause value.

DESCRIPTION OF THE EMBODIMENT

The present invention provides a radio communication equipment that allow the user to grasp the radio wave condition of a nearby base station even when the SIM card of the radio communication equipment is made to be invalid, and a control method thereof.

Hereinafter, the present embodiment will be described in detail with reference to the attached drawings.

Figure 1:
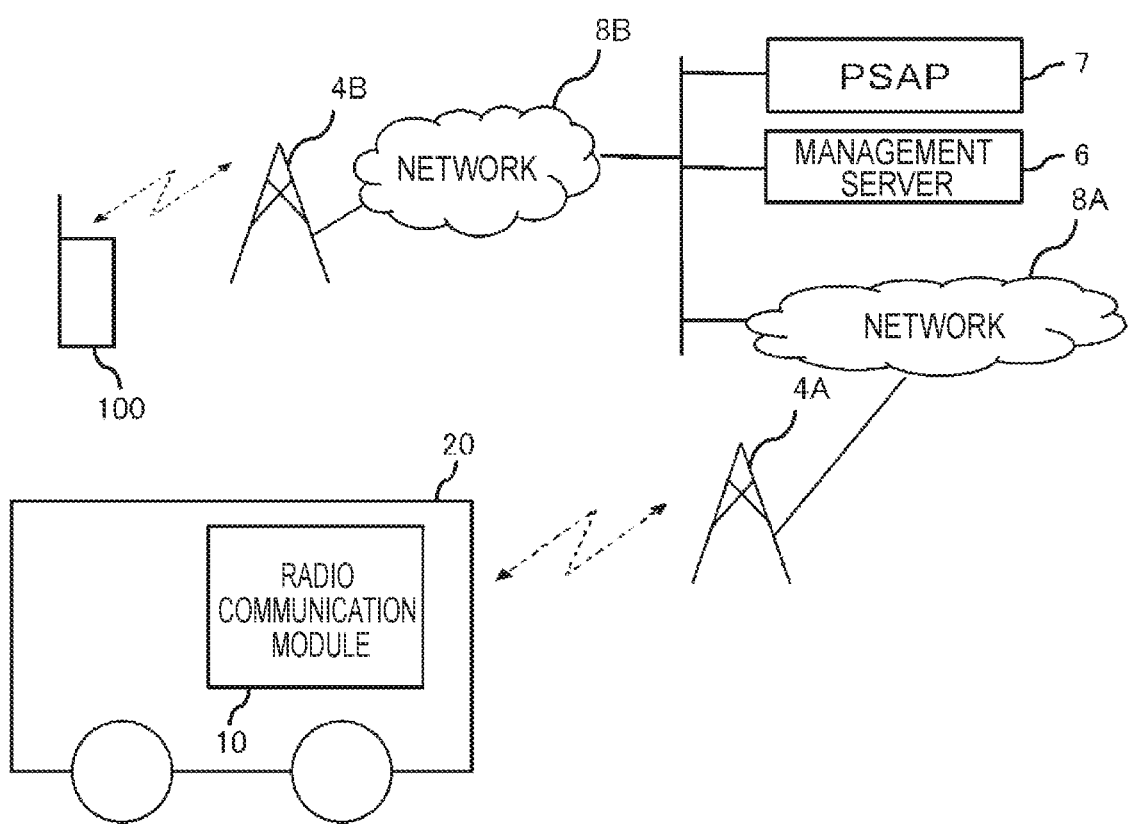
FIG. 1 illustrates an example of a radio communication system including a radio communication module according to a present embodiment.

FIG. 1 is a configuration diagram of the radio communication system according to the present embodiment. The radio communication system illustrated in FIG. 1 includes a vehicle 20 equipped with a radio communication module 10, a base station 4A, a base station 4B, a network 8A capable of communicating with the base station 4A, and a network 8B capable of communicating with the base station 4B a radio terminal 100, a management server 6, and a PSAP 7. The PSAP is an abbreviation of a public safety answering point.

The base station 4A, the base station 4B, the network 8A, and the network 8B are provided by a network operator A. Hereinafter, when the base station 4 or the network 8 is not distinguished for description, the base station 4 or the network 8 is simply described, whereas when the base station 4 or the network 8 is distinguished for description, the base stations 4A and 4B, or the networks 8A and 8B are described.

The base station 4 may cope with any mobile telecommunications systems, including second-generation mobile telecommunications systems, such as global system for mobile communications (GSM) (registered trademark), third-generation mobile telecommunications systems, such as code division multiple access (CDMA), or fourth-generation mobile telecommunications systems, such as long term evolution (LTE). The management server 6 may manage information of a user and information of the network 8.

The radio communication module 10 implements various functions. For example, a telematics service that provides an information service in real time by combining the vehicle 20 and a communication system is known. In the telematics service, map data and point of interest (POI) data for updating data of a navigation system are downloaded from the PSAP 7. Also, in the telematics service, the diagnostic information of a vehicle-mounted equipment is uploaded to the PSAP 7. The radio communication module 10 performs such a download and an upload via a network 8.

The radio communication module 10 is installed on a vehicle such as the vehicle 20. In the present embodiment, the vehicle 20 is described as a vehicle. Naturally, the vehicle may be anything that moves, such as a ship or a train. The radio communication module 10 may be installed on a mobile terminal such as a mobile phone or a smartphone. The radio communication module 10 may be a module for IoT (Internet Of Things).

The radio communication module 10 may cope with second-generation mobile telecommunications systems, third-generation mobile telecommunications systems, or fourth-generation mobile telecommunications systems. The radio communication module 10 may communicate with the radio terminal 100. The radio communication module 10 may have various functions and functions that execute programs created by a user.

Hereinafter, after explaining the components of the radio communication module 10, the process which each component performs is demonstrated.

Figure 2:
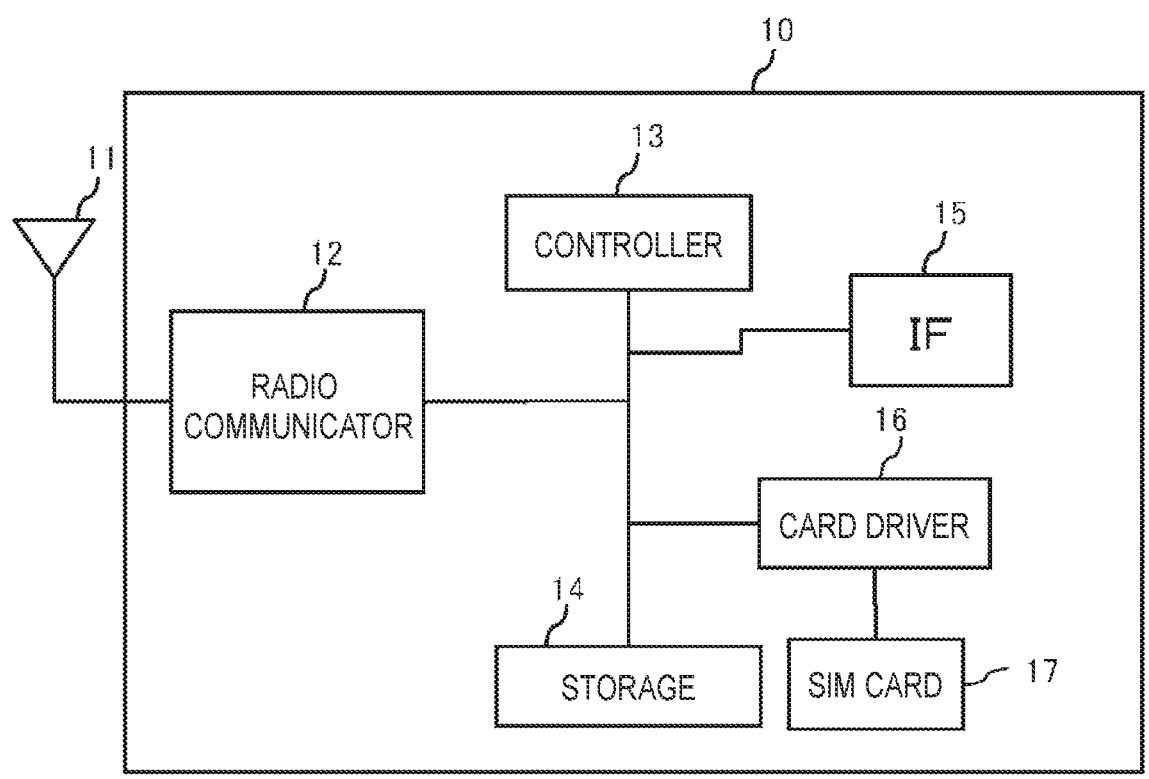
FIG. 2 is a schematic internal block diagram of the radio communication module according to the present embodiment.

FIG. 2 is a block diagram of the radio communication module according to the embodiment. The radio communication module illustrated in FIG. 2 has an antenna 11, a radio communicator 12, a controller 13, a storage 14, an IF 15, a card driver 16, and a subscriber identity module (SIM) card 17.

The antenna 11 transmits and receives radio signals with the base station 4.

The radio communicator 12 communicates with the base station 4 by radio communication through the antenna 11. The radio communicator 12 has an analog signal processor and a digital signal processor.

The analog signal processor performs amplification, an analog-to-digital conversion process, and any other process of radio signals received from the antenna 11, performs analog amplification, including a digital-to-analog conversion process, of the digital signals transferred from the digital signal processor, and transmits the analog signals through the antenna 11.

The digital signal processor encodes data transferred from the controller 13, and converts the data into digital signals such that the data can be transmitted through the communication channel of radio signals, whereas the digital signal processor decodes the digital signals transferred from the analog signal processor, and transfers the decoded data to the controller 13.

The controller 13 is mainly configured of a microcomputer formed of a digital signal processor (DSP), a central processing unit (CPU) that executes various programs, a read only memory (ROM), a random access memory (RAM), a backup RAM, an input/output (I/O), and any other component (none of them are illustrated in the drawings), and executes various control programs stored on the ROM to execute various processes. The controller 13 executes processes necessary to control the radio communicator 12.

The storage 14 is configured of an electronically erasable and programmable read only memory (EEPROM) that can electrically rewrite the content, for example, and the storage 14 stores programs and information necessary to control the radio communicator 12.

An IF 15 is a USB IF or another IF, and is connected to a display, a microphone and a speaker, or a navigation system. The IF 15 is also an interface for notifying the user of notification information, and the notification information is transmitted by a display, a microphone, a speaker, and the like via the IF 15. The controller 13 can notify the user of whether or not the service of the network operator is available. Further, the controller 13 notifies the user of the electric field strength of the radio signal transmitted from the base station 4. The electric field strength may be notified to the user by an antenna pictograph displayed on the display.

The card driver 16 drives an IC card referred to as a SIM card (or a UIM card), i.e., an information card. The card driver 16 may accept and reject the SIM card 17. In the case in which the card driver 16 is instructed to read or write configuration information by the controller 13, the card driver 16 reads configuration information recorded on the SIM card 17, and writes configuration information on the SIM card 17.

Generally, the SIM card is an IC card recording information that identifies a subscriber, communication carrier identification information that identifies a communication carrier, and information on services usable by the subscriber in contract, and any other information.

The SIM card 17 may be an embedded eSIM (embedded SIM). The SIM card 17 may be disposed on the outside of the radio communication module 10. The SIM card 17 may be supplied by the network operator, or may be obtained through other means. The user mounts or connects the supplied SIM card 17 to the radio communication module 10 to use the radio communication module 10.

The SIM card stores configuration information necessary for receiving a service, such as information for identifying a user. For example, an international mobile subscriber identity (IMSI) is written in the SIM card. The IMSI includes a home public land mobile network (HPLMN). A public land mobile network (PLMN) includes a country code (mobile country code: MCC) and an operator code (mobile network code: MNC).

The SIM card 17 records information for identifying a user, an identification code for identifying a network operator, and network information of a network operator that provides a service to which the user has subscribed or is about to subscribe. The radio communication module 10 may use, as the HPLMN, a network operator with which the user has a contract (hereinafter referred to as a home network operator).

The SIM card 17 may be a card-type SIM card (or a UIM card), and may be an embedded eSIM. The SIM card 17 may be capable of rewriting the operator code.

Figure 3:
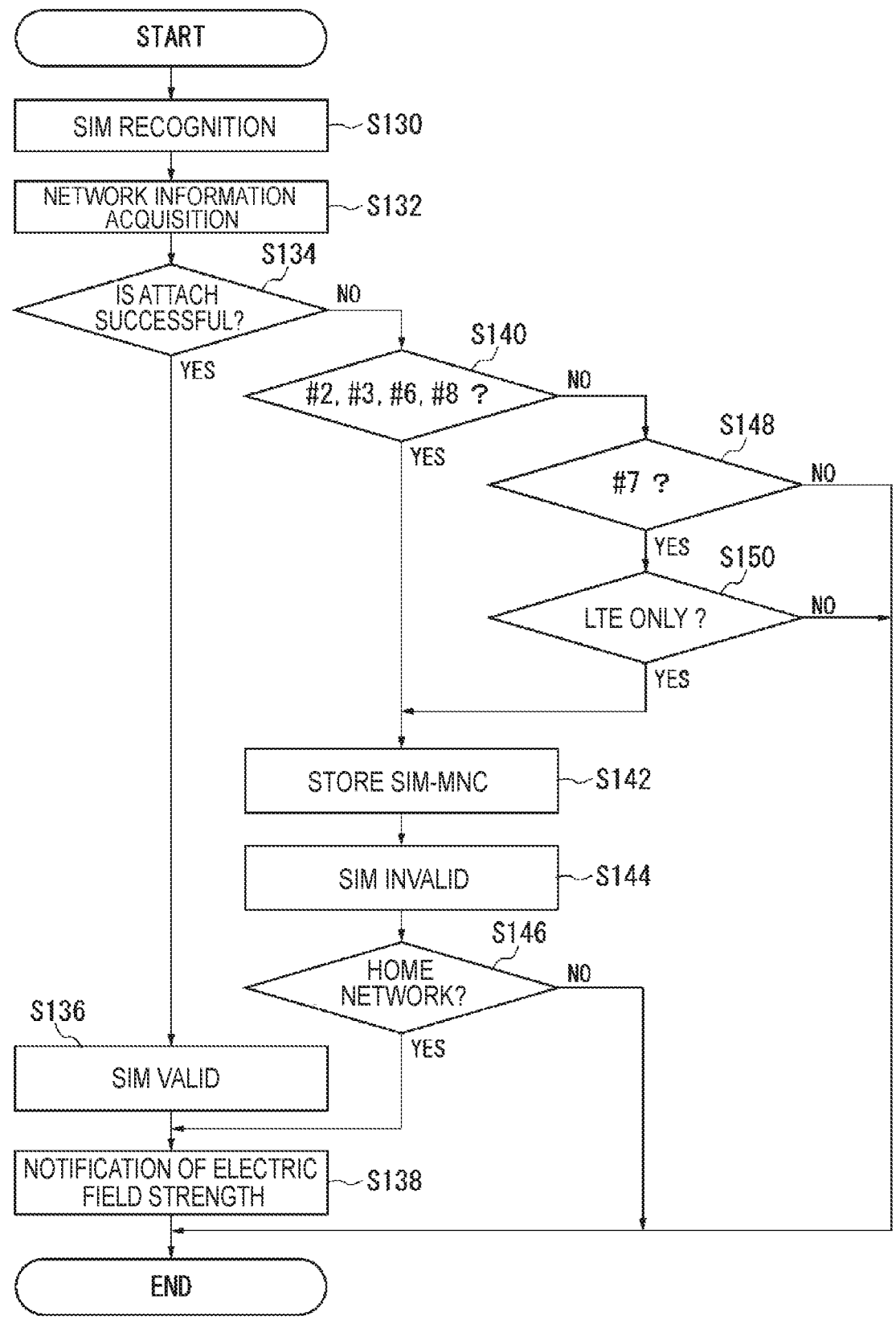
FIG. 3 is a flowchart illustrating the process performed by the radio communication module.

FIG. 3 is a flowchart illustrating the process performed by the radio communication module 10. This process is performed, for example, when the radio communication module 10 opens to the network of the network operator.

For example, this process is performed when the power of the radio communication module 10 is turned on or when the communication function is turned on.

First, the controller 13 checks whether the SIM 17 can be recognized, such as whether the SIM 17 is attached or the SIM 17 can be accessed (step S130).

When the controller 13 can recognize the SIM 17, the controller 13 acquires network information recorded in the SIM 17 (step S132). The controller 13 perform a connection to the network using the network information. For example, the controller 13 performs an attach to an evolved packet system (EPS) defined in the 3GPP.

When the network connection (attach) is successful (YES in step S134), the controller 13 makes the SIM 17 valid (step S136), and notifies the user of the electric field strength of the radio signal transmitted from the base station 4 of the home network operator (or the base station targeted for roaming) (step S138). The electric field strength may be notified to the user by an antenna pictograph displayed on the display.

The controller 13 treats the SIM 17 as invalid when the network connection (attach) fails (NO in step S134). At this time, the cause value is returned from the network 8. FIG. 4 is a diagram illustrating the description of the cause value. The cause value is defined in TS 24.301 or the like.

Generally, if the attach fails for the following cause values, there is a SIM 17 that is presumed not to be under contract.

2: User not registered (IMSI unknown in HSS)
3: Illegal terminal (Illegal UE)
6: Illegal equipment (Illegal ME)
8: Packet communication is not available (EPS services and non-EPS services not allowed)

When connection (attach) of the network fails due to the above-mentioned cause value (YES in step S140), the controller 13 stores the operator code (MNC) of the home network operator recorded in the SIM 17 (step S142), and, at the same time treats the SIM 17 as invalid (step S144).

When the radio communication module 10 treats the SIM card 17 as invalid, a limited service state, that is, a Limited Service state, will occur. The Limited Service state is a state in which only a limited service such as an emergency call is provided. The smartphone displays "out of area" on the display position of the antenna pictograph indicating the electric field strength in a situation where the SIM 17 is treated as invalid. However, when "out of area" is displayed, the user can not understand whether or not the radio communication module 10 receives the radio signal transmitted from the base station 4. Therefore, the following process is performed.

The base station 4 broadcasts control information to the mobile station by means of a channel (BCCH: broadcasting control channel). When information including the country code and the operator code is notified from the BCCH, the controller 13 can acquire the country code and the operator code.

The controller 13 determines whether or not an operator code matches the stored operator code of the home network operator, the matching operator code being acquired from the base station 4, and when it is determined that it matches the operator code of the home network operator (YES in step S146), the controller 13 notifies the user of the electric field strength of the radio signal transmitted from the base station 4 of the operator code (step S138).

When there is no operator code that matches the operator code of the home network operator (NO in step S146: for example, in the case of roaming), the controller 13 may notify the user of the electric field strength of the radio signal transmitted from the base station 4, may end the process without notification of the electric field strength, or may notify the user of information indicating "out of communication area".

If the attach fails for the following cause value among the cause values that are not the above cause values, the radio communication module 10 may not be the subject of a contract.

7: EPS service is not available (EPS services not allowed)

When the cause value is #7, only PS (Packet Switched) service is rejected. The network 8 includes one for PS service and one for a circuit switched (CS) service. The SIMs include one for dedicated to PS service, one for dedicated to CS service, and one for dedicated to both PS service and CS service. When the cause value is not #7 (NO in step S148), the controller 13 may end the process without notifying the user of the electric field strength of the radio signal transmitted from the base station 4, or may notifies the user of information indicating "out of communication area".

Here, when the cause value #7 is returned from the network 8 (YES in step S148), when the SIM 17 is a SIM specialized for the PS service such as LTE (YES in step S150), for example, when the SIM 17 is (LTE Only) for Voiceover LTE (VoLTE), the process proceeds to step S142.

When SIM 17 is not a SIM specialized for the PS services such as LTE (NO in step S150), controller 13 may make the SIM valid to receive a wideband code division multiple access (WCDMA: registered trademark) or a global system for mobile communications (GSM: registered trademark) which provide the CS service), or may notifies the user of information indicating "out of communication area".

As described above, when the radio communication module 10 treats the SIM card 17 as invalid, it notifies the user of the electric field strength of the radio signal transmitted from the base station 4, so that the user can grasp the radio wave conditions of the nearby base station.

Since the radio communication module 10 notifies the user of the electric field strength of the radio signal transmitted from the base station of the home network operator, the user can grasp the radio wave condition of the base station of only the home. In addition, the radio wave condition of the base station of only the home represents an indicator as to whether the radio communication module 10 is located at a place where the contract can be made.

The radio communication module 10 can treat the SIM 17 as invalid according to the cause value returned from the network 8. Further, the radio communication module 10 can treat the SIM 17 as invalid according to the cause value returned from the network 8 and the type of the SIM 17 (whether such a service can be used).

The respective steps in the radio communication module 10 in the present specification do not necessarily have to be processed in chronological order according to the order described in the flowchart, and may include processing in parallel or by a subroutine.

INDUSTRIAL APPLICABILITY

The present invention can provide a radio communication equipment that allow the user to grasp the radio wave condition of a nearby base station even when the SIM card of the radio communication equipment is made to be invalid, and a control method thereof.

The invention claimed is:
1. A radio communication equipment installed on a vehicle comprising:
   an information card on which network information of a network operator providing a service is stored; and
   a processor and a memory coupled to the processor, the processor configured to:
      perform radio communication with a base station capable of communicating with a network;
      drive the information card;
      establish connection with the network and treat the information card as invalid when the connection with the network fails; and
      notify a user of the radio communication equipment of an electric field strength of a radio signal transmitted from the base station communicating with the network with which the connection fails when treating the information card as invalid, wherein
   a cause value is returned from the network when the connection with the network fails, and
   the processor is configured to
      treat the information card as invalid, when the information card is an information card specialized for a packet service when the cause value returned from the network is a cause value indicating that only the packet service is rejected, and
      determine that the information card is the information card specialized for the packet service when the information card is an information card specialized for LTE (long term evolution).
2. The radio communication equipment according to claim 1, wherein the processor is configured to acquire, from the base station, an operator code of a network operator of the base station when treating the information card as invalid, and notify the user of an electric field strength of a radio signal transmitted from the base station having an operator code matching an operator code of the network information, of the acquired operator code.
3. The radio communication equipment according to claim 1, wherein
   the processor is configured to treat the information card as invalid when the cause value returned from the network is a cause value indicating that the information card is presumed to be not under contract.
4. A vehicle on which the radio communication equipment according to claim 1 is installed.

5. A control method of a radio communication equipment installed on a vehicle, the radio communication equipment comprising
an information card on which network information of a network operator providing a service is stored, the control method comprising:
performing radio communication with a base station capable of communicating with a network;
driving the information card;
establishing connection with the network via a radio communicator and treating the information card as invalid when the connection with the network fails; and
notifying a user of the radio communication equipment of an electric field strength of a radio signal transmitted from the base station communicating with the network with which the connection fails when treating the information card as invalid, wherein
a cause value is returned from the network when the connection with the network fails, and
the control method further comprises:
treating the information card as invalid, when the information card is an information card specialized for a packet service when the cause value returned from the network is a cause value indicating that only the packet service is rejected, and
determining that the information card is the information card specialized for the packet service when the information card is an information card specialized for LTE (long term evolution).

* * * * *